(12) United States Patent
Morrar

(10) Patent No.: US 12,355,506 B2
(45) Date of Patent: Jul. 8, 2025

(54) TECHNIQUES FOR CALIBRATION AND MEASUREMENTS OF AN E-BAND SATELLITE COMMUNICATION (SATCOM) SYSTEM

(71) Applicant: Hughes Network Systems, LLC, Germantown, MD (US)

(72) Inventor: Sam Morrar, Frederick, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 860 days.

(21) Appl. No.: 17/522,805

(22) Filed: Nov. 9, 2021

(65) Prior Publication Data

US 2023/0127955 A1    Apr. 27, 2023

Related U.S. Application Data

(60) Provisional application No. 63/270,973, filed on Oct. 22, 2021.

(51) Int. Cl.
*H04B 17/40* (2015.01)
*H04B 7/185* (2006.01)
*H04B 17/14* (2015.01)

(52) U.S. Cl.
CPC ......... *H04B 17/40* (2015.01); *H04B 7/18528* (2013.01); *H04B 17/14* (2015.01)

(58) Field of Classification Search
CPC ..... H04B 17/40; H04B 17/14; H04B 7/18528
See application file for complete search history.

(56) References Cited

U.S. PATENT DOCUMENTS

| | | | |
|---|---|---|---|
| 6,643,597 B1 * | 11/2003 | Dunsmore | G01R 27/28 702/85 |
| 9,116,187 B1 * | 8/2015 | Owen | G01R 27/28 |
| 9,325,290 B1 * | 4/2016 | Tsironis | H01P 5/04 |
| 9,479,232 B1 * | 10/2016 | Loui | H04B 7/0617 |

(Continued)

OTHER PUBLICATIONS

Keysight Technologies, "PNA-X Series, Microwave Network Analyzers", May 7, 2015, 42 pages.

(Continued)

*Primary Examiner* — Dominic E Rego
(74) *Attorney, Agent, or Firm* — Mannava & Kang, P.C.

(57) ABSTRACT

A system for providing efficient, reliable, and accurate calibration and measurements of a satellite communication (SATCOM) test system, especially in E-band frequencies where precision of measurement and calibration plays a large role in reliable communications at terabit data rates. The system may include a vector network analyzer (VNA), at 67 GHz operation, calibrated using SOLT-type calibrations. The vector network analyzer (VNA) may be communicatively coupled to a device under test (DUT) or system under test (SUT) to obtain calibration and measurement data. The system may also include a signal generator for generating at least one signal. The system may further include an active mixer communicatively coupled to the signal generator. The active mixer may up-convert the least one signal to E-band frequencies. In some examples, the vector network analyzer (VNA), the local oscillator (LO) signal generator, and the active mixer may be synchronized or phase-locked using a reference.

20 Claims, 7 Drawing Sheets

(56) References Cited

U.S. PATENT DOCUMENTS

| | | | | |
|---|---|---|---|---|
| 10,871,508 | B1* | 12/2020 | Roberts | G01R 1/24 |
| 11,863,148 | B1* | 1/2024 | Tsironis | H01P 1/38 |
| 2003/0171886 | A1* | 9/2003 | Hill | G01R 27/32 |
| | | | | 702/91 |
| 2004/0070405 | A1* | 4/2004 | Wu | G01R 35/005 |
| | | | | 324/601 |
| 2004/0100276 | A1* | 5/2004 | Fanton | G01R 35/00 |
| | | | | 702/85 |
| 2005/0170789 | A1* | 8/2005 | Consolazio | H04B 1/18 |
| | | | | 455/90.3 |
| 2006/0148472 | A1* | 7/2006 | Bradley | H03K 7/08 |
| | | | | 455/434 |
| 2009/0092177 | A1* | 4/2009 | Dvorak | H04B 17/101 |
| | | | | 375/224 |
| 2014/0236517 | A1* | 8/2014 | Verbeyst | G01R 27/28 |
| | | | | 702/85 |
| 2014/0300430 | A1* | 10/2014 | Feldman | H01P 5/1015 |
| | | | | 333/4 |
| 2014/0341263 | A1* | 11/2014 | Wu | H04B 17/21 |
| | | | | 375/224 |
| 2014/0342581 | A1* | 11/2014 | Clyatt | H01R 24/50 |
| | | | | 439/63 |
| 2015/0212129 | A1* | 7/2015 | Chayat | H01P 5/028 |
| | | | | 324/638 |
| 2016/0072530 | A1* | 3/2016 | El-Hassan | H04B 1/0475 |
| | | | | 455/114.2 |
| 2016/0277058 | A1* | 9/2016 | Zhai | H04B 1/54 |
| 2017/0222736 | A1* | 8/2017 | Hechtfischer | H04B 17/103 |
| 2019/0236332 | A1* | 8/2019 | Barychev | G06V 20/698 |
| 2019/0261262 | A1* | 8/2019 | Stiles | H04B 10/1123 |
| 2019/0310299 | A1* | 10/2019 | Kang | G01R 29/0892 |
| 2020/0166565 | A1* | 5/2020 | Frolov | G01R 35/005 |
| 2020/0174061 | A1* | 6/2020 | Weiss | G01R 31/2822 |
| 2020/0200810 | A1* | 6/2020 | Kuhn | G01R 31/31917 |
| 2020/0313063 | A1* | 10/2020 | Pollanen | H01P 3/06 |
| 2021/0181289 | A1* | 6/2021 | Held | G01R 35/005 |
| 2021/0182181 | A1* | 6/2021 | Vezier | G06F 30/343 |
| 2021/0286036 | A1* | 9/2021 | Williams | G01R 35/007 |
| 2021/0328360 | A1* | 10/2021 | Yoon | H01Q 9/0407 |
| 2021/0408372 | A1* | 12/2021 | Akinwande | H10N 70/821 |
| 2022/0050003 | A1* | 2/2022 | Brown | G01L 25/003 |
| 2022/0057441 | A1* | 2/2022 | Spirito | G01R 31/2822 |
| 2022/0171022 | A1* | 6/2022 | Bourde | G01S 7/4095 |
| 2022/0229110 | A1* | 7/2022 | Vanden Bossche | |
| | | | | G01R 31/31905 |
| 2022/0357237 | A1* | 11/2022 | Tan | G01M 11/3145 |
| 2023/0075278 | A1* | 3/2023 | Chen | G01R 31/2822 |

OTHER PUBLICATIONS

Nadia Fezai et al., "Characterization Of Reflection And Attenuation Parameters of Device Under Test by VNA", 2020 4th IC_ASET, Year 2000, 4 pages.

Search Report and Written Opinion for PCT Application No. PCT/US2022/047412, mailed Feb. 3, 2023, 9 pages.

\* cited by examiner

TECHNIQUES FOR CALIBRATION AND MEASUREMENTS OF AN E-BAND SATELLITE COMMUNICATION (SATCOM) SYSTEM

PRIORITY

This patent application claims priority to U.S. Provisional Patent Application No. 63/270,973, entitled "Techniques for Calibration and Measurements of an E-band Satellite Communication (SATCOM) System," filed on Oct. 22, 2021, which is hereby incorporated by reference herein in its entirety.

TECHNICAL FIELD

This patent application is directed to satellite communication systems, and more specifically, to systems and methods for calibration and measurements of a satellite communication (SATCOM) test system using commercially allocated E-band frequencies.

BACKGROUND

Advances in telecommunications technologies are providing consumers with more access to voice and data services. Satellite communication systems may be used to provision voice and data services that require higher bandwidths for transmission and higher frequency spectra, such as E-band for SATCOM (71-76 GHz, 81-86 GHz). However, as telecommunications technologies continue to advance, satellite communication systems must adapt to increasing consumer demand, swelling constraints of regulatory requirements, and provisioning of quality services. Using E-band frequencies in satellite communication (SATCOM) systems can help, but may also create other issues and technical challenges.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
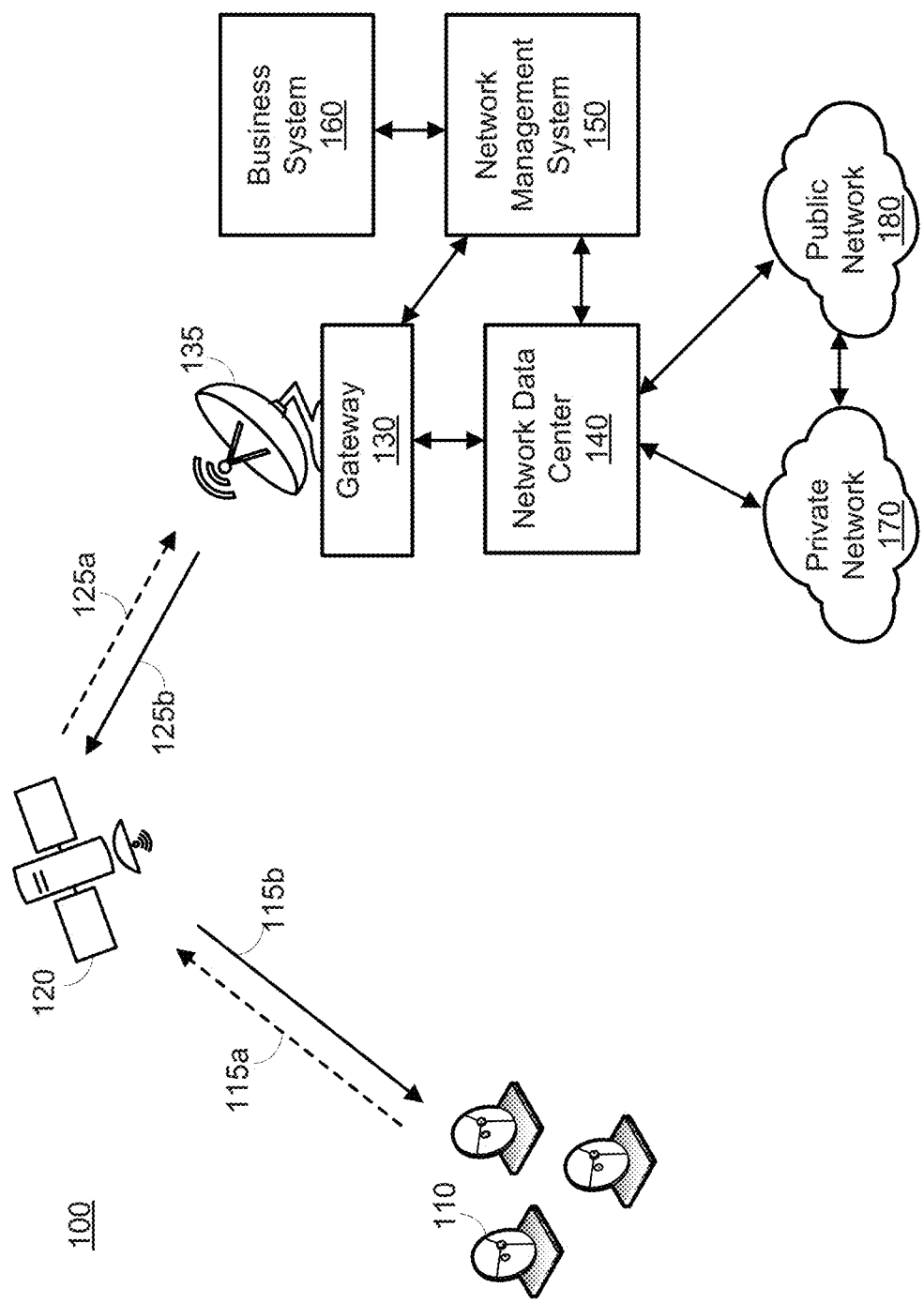
FIG. 1 illustrates satellite communication system, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As discussed above, as telecommunications technologies continue to advance, satellite communication (SATCOM) systems must adapt to increasing consumer demand, swelling constraints of regulatory requirements, and provisioning of quality services, higher bandwidth demands and additional spectrum usage requirements to meet higher throughput demands, such as those exploited in very high throughput satellite (VHTS) systems. Using E-Band frequencies in satellite communication (SATCOM) system may help with broadband services, but may also create other issues and technical challenges, some of which are described by Sam Morrar in "Using E-Band for Wideband Satcom: Opportunities and Challenges," MWJournal, August 2021, which is hereby incorporated by reference in its entirety.

Existing Q-, V- and Ka-Band systems may be spectrally crowded, with limited bandwidth available and suitable for very high throughput satellite (VHTS) communication systems. Thus, the motivation to use E-Band is clear. To use E-Band, licensees may need to pay a reasonably small administrative fee to regulating authorities, and this licensing model may provide full interference protection and may make the economics of terabit (Tbps) connectivity attractive for any number of very high throughput satellite (VHTS) communication systems. This, along with updates in antenna advantages, has spurred research into the commercial viability of using E-band to provide gigabit (Gbps) connectivity at a level complementing fiber optic cable.

By way of example, it should be appreciated that two 5 GHz frequency bands may be generally available in E-Band for very high throughput satellite (VHTS) communication systems. However, adopting these high frequencies makes radio frequency (RF) component and subsystem development challenging for any satellite communications (SATCOM) system, as well as the test and measurement (T&M) equipment and setups for working in E-Band. At these frequencies, propagation, and atmospheric attenuation may require higher power and lower noise figure components, not to mention technology under development for space qualified operation for the communication links.

As the need for more bandwidth and terabit data transmission in very high throughput satellite (VHTS) communication systems increases and the use of higher frequency bands such as V-band and E-band become more dominant, there may be a need for more accurate calibration and reliable and repeatable measurements in such systems, which may be especially critical at these significantly higher frequencies and shorter wavelengths, e.g., where parasitic radio frequency (RF) losses and transitions between components becomes increasingly significant. Accuracy of calibration, repeatability and reliability of measurements at E-band for SATCOM (70/80 GHz), for example, may therefore be important for broadband provisioning. The systems and methods described herein may provide accurate calibration and reliable measurements of a satellite communication (SATCOM) test system using E-Band frequencies.

FIG. 1 illustrates satellite communication system, according to an example. In some examples, the system 100 may depict a satellite communication system capable of providing at least voice and/or data services. In some examples, the satellite communication system may be a high throughput satellite (HTS) system. The system 100 may include any number of terminals 110, a satellite 120, a gateway 130, a network data center 140, a network management system (NMS) 150, a business system 160, or other various system elements or components. The system 100 may also include a private network 170 and/or public network 180. It should be appreciated that the system 100 depicted in FIG. 1 may be an example. Thus, the system 100 may or may not include additional features and some of the features described herein may be removed and/or modified without departing from the scopes of the system 100 outlined herein.

The terminals 110 may be any variety of terminals. For example, the terminals 110 may be earth-station antennas or terminals or customer terminals, such as very small aperture terminals (VSATs). It should be appreciated that terminals 110 may be mounted on a structure, habitat, or other object or location. Depending on application, the terminals 110 may include or incorporate any number of antenna dishes, which may be provided in various sizes, depths, or dimensions (e.g., small, medium, large, etc.). Although the terminals 110 may typically remain in the same location once mounted, the terminals 110 may be removed from their mounts, relocated to another location, and/or may be configured to be mobile terminals. For instance, the terminals 110 may be mounted on mobile platforms that facilitate transportation thereof from one location to another. Such mobile platforms may include, for example, any number of mobile vehicles, such as cars, buses, boats, planes, etc. It should be appreciated that such terminals 110 may generally be operational when still and not while being transported. That said, there may be scenarios where the terminals 110 may be transportable (mobile) terminals that remain operational during transit. As used herein, the terms "terminal," "satellite terminal," and/or "earth-station antenna" may be used interchangeably to refer to these terminal types.

It should be appreciated that any number of customer premise equipment (CPE) (not shown) may be communicatively coupled to the terminals 110. In some examples, the customer premise equipment (CPE) may include any number of computing or mobile devices. For example, such a computing or mobile device may include a laptop, a tablet, a mobile phone, an appliance, a camera, a sensor, a thermostat, a vehicle, a display, etc. In general, the customer premise equipment (CPE) may include, without limitation, any number of network-enabled computing devices, elements, or systems. It should be appreciated that a network of such devices may be commonly referred to as the "Internet of Things" (IoT).

The satellite 120 may be an object intentionally placed into orbit. In some examples, the satellite 120 may be an artificial satellite that is configured to transmit and receive data signals. For example, the satellite 120 may form one or more beams and provide connectivity between at least the terminals 110 and the gateway 130. More specifically, the satellite 120 may communicate data signals using these beams with the terminals 110 via a terminal return channel 115a and a terminal forward channel 115b, and with the gateway 130 via a gateway return channel 125a and a gateway forward channel 125b. It should be appreciated that the satellite 120 may form any number of beams to communicate data signals with any number of components, even beyond the terminals 110 or the gateway 130 as shown.

In some examples, the satellite 120 may be a communication satellite, such as a high-throughput satellite, which may include any satellite that is capable of providing at least twice (e.g., 20+ times, 100+ times, etc.) the total amount of throughput as a classic fixed-satellite service (FSS) satellite. In some examples, the satellite 120 may include, but not limited to, a transponder satellite, a regenerative satellite, and/or other similar satellite that may generate one or more spot beams. Furthermore, in some examples, the satellite 120 may operate in geosynchronous, mid-earth, low-earth, elliptical, or some other orbital configuration.

The gateway 130 may include or be communicatively coupled to a transceiver 135, such as a radio frequency transceiver (RFT). The transceiver 135 may include an antenna unit of any type (e.g., transmitter, receiver, communication element, etc.), which may transmit and receive signals. The antenna unit may also include an earth-station antenna. In some examples, the radio frequency transceiver (RFT) may include a type of high power amplifier (HPA) and one or more low-noise amplifiers (LNA). In some examples, the transceiver 135 may be useable, by the gateway 130 of system 100, to transmit and receive data from the terminals 110, via communications from the satellite 120, and may be configured to route data and traffic from these terminals 110 to any other element or component in the system 100, such as the network data center 140 and/or network management system (NMS) 150. The gateway 130 may be further configured to route traffic to and from the public network 180 and/or private network 170 across the satellite communication channels 115a, 115b, 125a, or 125b to any terminal 110, which would then provide data communications or route traffic to any customer premise equipment (CPE) (not shown) associated with the terminal 110. It should be appreciated that the gateway 130 may also include back-up and/or diversity gateways, which may be used in the event a main gateway experiences significant attenuation, especially at the higher operational outbound and inbound frequencies. Although depicted as a single element, the gateway 130 may include a single gateway, multiple gateways residing locally or remotely, in full or in part, relative to the other system components.

The network data center 140 may be communicatively coupled to the gateway 130, as well as other system components, such as the network management system (NMS) 150, private network 170, and/or public network 180. In some examples, the network data center 140 may be a satellite network data center that is configured to perform protocol processing and bandwidth allocation for gateway traffic and/or terminal communications in the served beams. An internet protocol gateway (IPGW) (not shown) of the network data center 140 may help facilitate a traffic processing function, which may allow forwarding and protocol processing between external public networks and private networks (e.g., private network 170 and/or public network 180), and gateway communication channels. Although depicted in FIG. 1 as a separate and distinct element, the network data center 140, in some examples, may be collocated and/or integrated, fully or partially, with the gateway 130, or may be positioned at some other location. Furthermore, although shown as a single element, the network data center 140, in some examples, may be include a plurality of network data centers that are local or remote, in full or in part, relative to the other system components. The network data center 140 and the gateway 130 may include many other functions not directly referenced in this description and therefore omitted for clarity.

The network management system (NMS) 150, maintains, in full or in part, various information (configuration, processing, management, etc.) for the gateway 130, and terminals 110 and beams supported by the gateway 130. It should be appreciated that the network management system (NMS) 150 may or may not be co-located within the same physical structure as the gateway 130. Furthermore, the network management system (NMS) 150 may be a single component or a plurality of distributed components that may be communicatively coupled to each other and/or with other system elements, such as the gateway 130 (e.g., using the previously described hardware and external networks). The network management system (NMS) 150 may, among other things, include a configuration manager or other similar management unit. The network management system (NMS) 150 may also include any number of reporting systems. As will be discussed in greater detail below, each of these multiple reporting systems may be configured to receive different information (e.g., reports) from the terminals 110. External reporting systems may also be configured to receive information (e.g., reports) from the terminals 110 by establishing a communication link with network management system (NMS) 150.

The business system 160, or other various system elements or components, may also be communicatively coupled to the network management system (NMS) 150 and/or gateway 130. In some examples, the business system 160 may include a virtual network operator (VNO), which may be configured to communicate with the gateway 130 and/or the network management system (NMS) 150 in order to monitor the status of its own terminals 110. More particularly, a virtual network operator (VNO), in some scenarios, may be a business or government entity, that may have access (by purchase or license) to a managed service and associated capacity from a satellite network operator in order to provide communication connectivity and/or communication for a privately-owned set of terminals 110. The virtual network operator (VNO) may therefore manage various aspects of such terminals 110 via the gateway 130 and/or the network management system (NMS) 150.

The private network 170 and/or public network 180 may include any variety of networks. For example, the private network 170 may be a local area network (LAN), and the public network 180 may be a wide area network (WAN). That said, the private network 170 and/or public network 180 may each also be a local area network (LAN), wide area network (WAN), the Internet, a cellular network, a cable network, a satellite network, or other network that facilitates communication between the components of system 100 as well as any external element or system connected to the private network 170 and/or public network 180. The private network 170 and/or public network 180 may further include one, or any number, of the exemplary types of networks mentioned above operating as a stand-alone network or in cooperation with each other. For example, the private network 170 and/or public network 180 may utilize one or more protocols of one or more clients or servers to which they are communicatively coupled. The private network 170 and/or public network 180 may facilitate transmission of data according to a transmission protocol of any of the devices and/or systems in the private network 170 and/or public network 180. Although each of the private network 170 and/or public network 180 is depicted as a single network in FIG. 1, it should be appreciated that in some examples, each of the private network 170 and/or public network 180 may include a plurality of interconnected networks as well.

While the processors, components, elements, systems, subsystems, and/or other computing devices may be shown as single components or elements, one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100 and their components, as shown in FIG. 1.

As described above, there is a growing need for more bandwidth and terabit data transmission in very high throughput satellite (VHTS) communication systems and use of higher frequency bands such as V-band and E-band is becoming more prevalent in order to support higher bandwidth and data demands from consumers. Accordingly, there may be a need for more accurate calibration and reliable and repeatable measurements in such systems, which may be especially critical at higher frequencies and shorter wavelengths. Accuracy of calibration, repeatability and reliability of measurements at E-band for SATCOM (70/80 GHz), for example, may therefore be important for broadband provisioning. The systems and methods described herein may provide accurate and efficient calibration and measurements of a satellite communication (SATCOM) test system using E-Band frequencies.

It should be appreciated that approaches for calibration and measurement may be available at frequencies above 60 GHz to operate. However, these solutions typically do not offer or provide accurate, repeatable and reliable measurements to the levels of accuracy typically required for SATCOM systems and/or other required engineering analysis to develop such systems and to model them. For example, desired measurement accuracy levels may be less than 0.1 dB levels of accuracy for example for gain flatness measurement over a 5 GHz bandwidth.

Figure 2A:
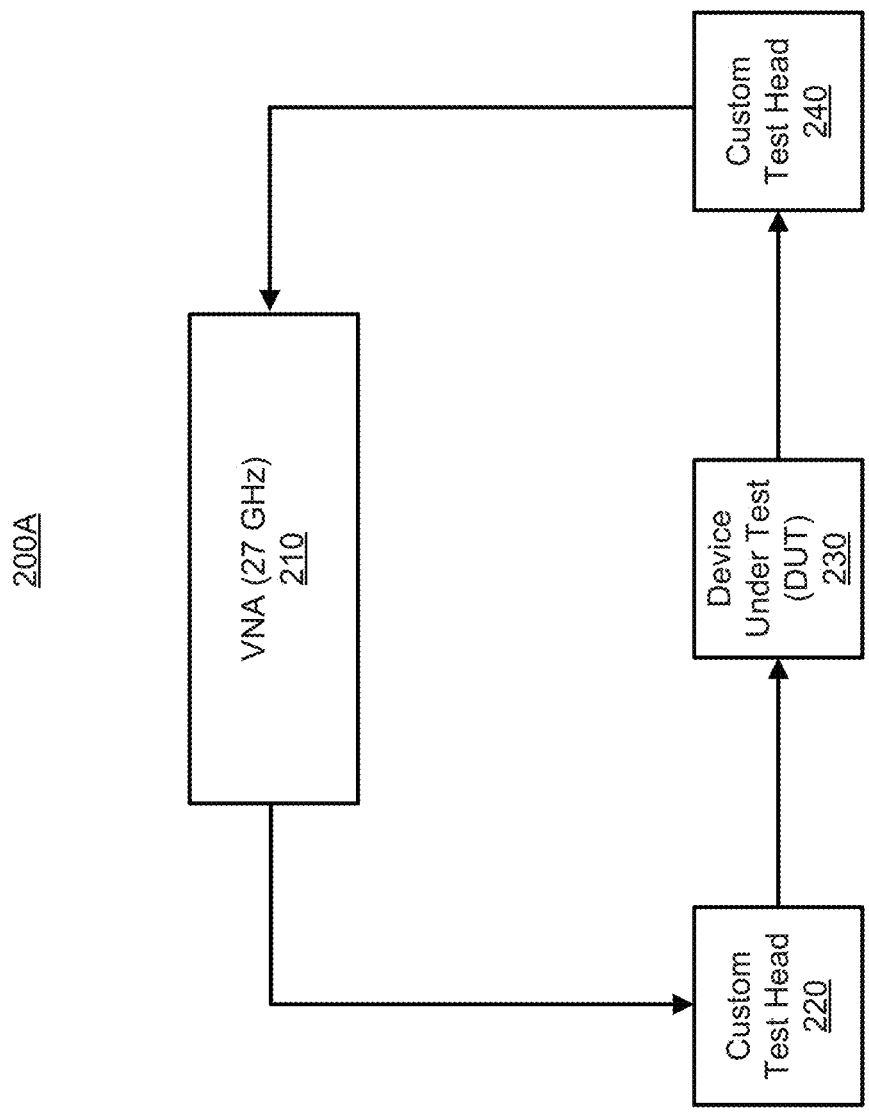
FIG. 2A illustrates a configuration for providing calibration and measurements of a satellite communication (SATCOM) test system, according to an example.

FIG. 2A illustrates a configuration 200A for providing calibration and measurements of a satellite communication (SATCOM) test system, according to an example. As shown, the configuration 200A may include a vector network analyzer (VNA) 210, two custom test heads 220 and 240, and a device under test (DUT) 230.

The vector network analyzer (VNA) 210 may be a precision measuring instrumentation that may be used to test electrical performance of high frequency components or systems, e.g., in the radio frequency (RF), microwave, and millimeter-wave frequency bands. In some examples, the vector network analyzer (VNA) 210 may operate to 27 GHz, as shown. Here, the vector network analyzer (VNA) 210 may further require external, complex, and/or expensive customized test-heads that require complex and time consuming software calibrations prone to errors, such custom test head 220 and 240, to be purchased and developed by the vector network analyzer (VNA) manufacturer or a subcontractor for the vector network analyzer (VNA) manufacturer to make multiple undesirable conversions to a desired band under test.

It should be appreciated that these custom test heads 220 and 240 may be relatively costly and may require specialized vector network analyzer (VNA) test-head correction software, among other specialized software applications, to perform complex vector-error corrections. And even then, the custom test heads 220 and 240 may still provide inaccurate results and may be prone to other hang-ups or errors, especially in various independent/Internal research and development (IRAD) measurements and testing. For example, the configuration may 200A may also include the additional custom hardware/software that operates locally or remoted in the systems or devices shown, in order to calibrate and/or synchronize, for instance, the custom test head 220 and 240 to the vector network analyzer (VNA) 210. Such software operation and configuration may involve long and arduous processes that are prone to unpredictable outcomes in measurement and calibrations.

It should be appreciated that a vector network analyzer (VNA) 210 may provide high measurement accuracy by calibrating the test system using, for example, a mathematical technique called vector error correction (VEC). Vector error correction may account for measurement errors in the network analyzer itself, plus all the test cables, adapters, fixtures, and/or probes that are between the analyzer and a device under test (DUT) 230.

The device under test (DUT) 230 may include any number of network devices used for broadband provisioning. In some examples, the device under test (DUT) 230 may be a radio frequency (RF) gateway. The device under test (DUT) 230, sometimes also referred to as a system under test (SUT) or hardware under test (HUT) may replicate or model, in some form (limited or unlimited) a network device or system. For instance, the device under test (DUT) 230 may replicate or model a gateway ground forward/return path through an E-band gateway. In some examples, the device under test (DUT) 230 may also replicate or model forward and/or return links to the satellite. For example, there may be two independent subsystems used in E-Band communications, such as the ground gateway subsystem and the satellite subsystem. These two subsystems may be combined, in some examples, to form a loopback path by connecting the output of the gateway subsystem to the input of the satellite subsystem using a WR-12 u-bend waveguide attachment. Thus, the device under test (DUT) 230 may be used, among other things, to replicate or model at least these two subsystems.

Data gathered from independent research and development (IRAD) investigation of E-band (71-76 GHz, 81-86 GHz) feasibility of a VHTS Commercial SATOM systems using traditional vector network analyzer (VNA) methods, for example, have revealed deficiencies in accuracy of calibration and repeatability of measurements, such as, among other things, group delay variation, gain and phase flatness over the E-band ranges using existing tradition vector network analyzer (VNA) methods, etc. Other challenges with conventional approaches may further include: (i) continuous and time-consuming (hours) of re-calibration of the expensive external test-heads and multiple conversions within the custom test heads 220 and 240, adding additional random noise and uncertainty to unacceptable levels of precision; (ii) followed by re-calibration of the vector network analyzer (VNA) itself for all ports used; and (iii) firmware hang-ups during the test-head calibrations and synchronization processes required for the vector network analyzer (VNA) test heads with the vector network analyzer (VNA), i.e. the vector network analyzer (VNA) must "see" the test-heads and make corrections for the given and sometimes multiple test-heads needed.

Figure 2B:
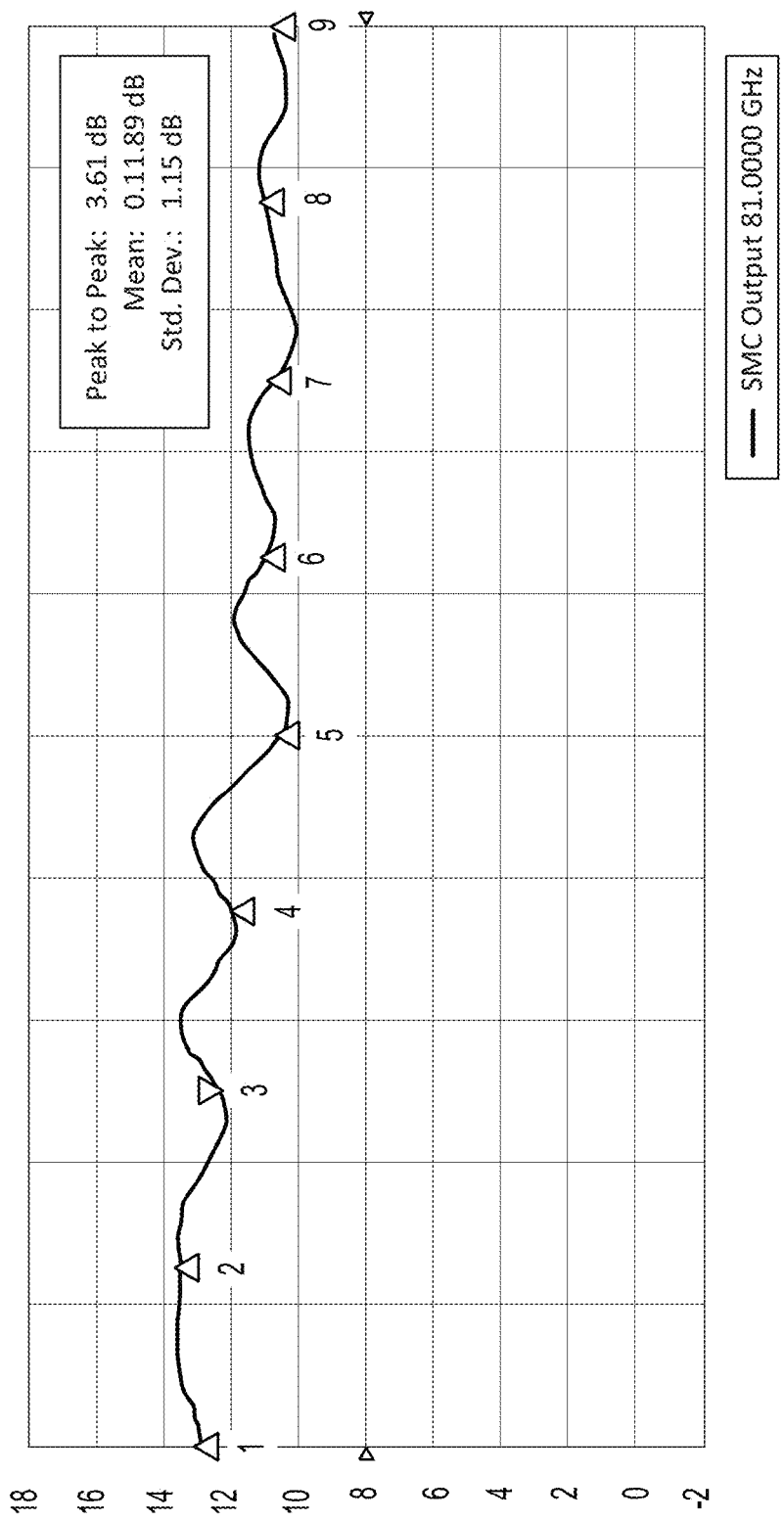
FIG. 2B illustrates a graph depicting calibration and measurement results using the configuration of FIG. 2A, according to an example.

FIG. 2B illustrates a graph 200B depicting calibration and measurement results using the configuration 200A of FIG. 2A, according to an example. Even with the above lengthy and expensive in time, equipment, manpower, results using the configuration 200A may still provide measurements with un-explained glitches and ripples in the gain responses over E-band. These results may even exceed acceptable calibration accuracy limits of ±0.05 dB needed for accurate measurement of gain/phase flatness over frequency and system models to produce useful results. As shown, the graph 200B illustrates an average of ten (10) measured gain flatness. Specifically, the graph 200B depicts 3.61 dB measure flatness to 83 GHz, which may be worse at 85 GHz.

In addition, use of 1.0 mm and 1.8 mm connector transitions to WR-12 required separate calibration files themselves and then to de-embed the errors from the measurements. In some examples, this may be a manual process. Furthermore, there may be errors related to signal leakage and directivity and crosstalk with external unshielded test-heads. Directivity limits dynamic range for reflection measurements, and crosstalk limits dynamic range for transmission measurements. Errors related to signal reflections may be source and load mismatch. Source mismatch errors may result from interactions between the test system's source match and the input match of the DUT 230.

Thus, a need for a faster, more efficient, cost effective, accurate, and repeatable solution may be needed to improve measuring and calibration solutions for E-band data collection. The systems and methods described herein provide accurate calibration and repeatable/reliable measurements of a satellite communication (SATCOM) test system using E-Band frequencies.

Figure 3A:
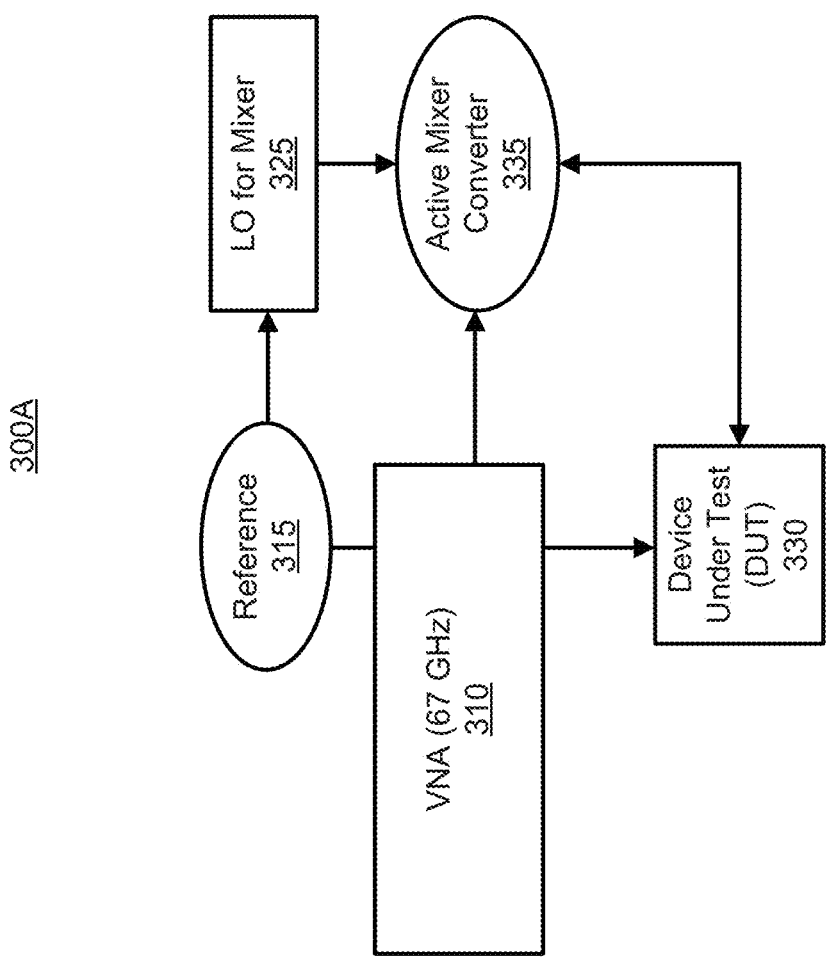
FIG. 3A illustrates a configuration for providing calibration and measurements of a satellite communication (SATCOM) test system, according to an example.

FIG. 3A illustrates a configuration 300A for providing calibration and measurements of a satellite communication (SATCOM) test system, according to an example. As shown, the configuration 300A may include a vector network analyzer (VNA) 310, a reference 315, a signal generator 325, an active mixer 335, and a device under test (DUT) 230.

As described above, there may be measurement challenges that must be overcome to obtain accurate, repeatable measurements. The first challenge may be for coaxial devices that are "non-insertable," which may refer to connectors on the device under test (DUT) that are such that the associated test-port cables of the test system cannot be connected directly together, without using some sort of RF adapter. During the through portion of the calibration, the electrical characteristics of the adapter must be measured and removed (de-embedded) from the calibration data.

The configuration 300A, as shown and described herein, may use a vector network analyzer (VNA) 310, such as a 67 GHz VNA, as opposed to the 27 GHz VNA 210 of FIG. 2A, which must use the external custom test heads 220 and 240 and all the associated drawbacks in that configuration 200A. It should be reiterated that use of the custom test heads 220 and 240, not to mention multiple internal converters, may mix up the desired frequency band, which may further adversely increase phase noise, additional thermal noise and causes errors in calibration and measurements, In order to obtain accurate calibration and reliable measurements using the configuration 300A, the system and methods described herein may include calibrating the vector network analyzer (VNA) 310 using a SOLT (short, open, load, through)-type calibration to make sure to account for reference planes where the DUT is measured.

In some examples, SOLT may refer to a basic test form that uses short, open, load, and (known) through standards. Advanced forms may use multiple shorts and loads, (unknown) through, arbitrary impedances (ECal), which in some examples may use a 12-term error model. Electrical standards used during the calibration process may be passive, employing mechanical devices, like the well-known short, open, load, and thru (SOLT) standards found commercial calibration kits, or they may be arbitrary known impedances that are electronically switched, as is done with ECal electronic calibration modules.

The signal generator 325 may include any signal generator with a reasonable phase noise and/or operating frequency range to supply the active mixer with a "clean" local oscillator (LO) input or signal. In some examples, the signal generator 325 may operate as a local oscillator (LO) signal generator for the active mixer 335. It should be noted that an active mixer 335 may be used, as opposed to a passive mixer, since an active mixer 325 may require substantially less LO power from the signal generator and may offer gain and lower-phase noise performance. That said, although the active mixer 335 is shown in FIG. 3A, a passive mixer or other similar device may also be used.

The active mixer 335, as shown, may be an active Ku-band mixer. In some examples, the active mixer 335 may be used to up-convert the 67 GHz up to the 71-76 or 81-86 GHz with low-loss and excellent dynamic range, low-noise and flatness. It should be appreciated that in some examples, mixer characteristics may be saved to in the vector network analyzer (VNA) 310 and subtracted/de-embedded from the measured results manually or automatically during calibration, measurement, or testing. Use of the active Ku-band Mixer 335 may help reduce costs, relative to two custom test heads 220 and 240, and may provide more accurate and reliable results without need for custom software for calibration and synchronization to the vector network analyzer (VNA) 310, only that's its characteristics are understood beforehand. It should be appreciated that the active mixer 335 may be configured to operate in a proper frequency range, e.g., operate and accept 67 GHz input. Using a Ku-band LO, the active mixer 335 may then up-convert from 67 GHz to 85 GHz, which means the active mixer 335 would accept 18 GHz LO input signal. It should be appreciated that the frequency of the signal generator 325 may be configurable over a wide bandwidth range to operate and cover the required frequency range of the device under test (DUT) 330.

The system and method may also ensure that the active mixer 335, the local oscillator (LO) signal generator 325, and the vector network analyzer (VNA) 310 is phase-locked to the reference 315. In some examples, the reference 310 may be an external precision 10 MHz or 100 MHz reference. It should be appreciated that is it not uncommon to use such a reference in a test and measurement environment.

The vector network analyzer (VNA) 310, for instance, may be designed to measure scattering parameters known in the RF/Microwave industry as "S-parameters" which are associated with measurements that characterize the DUT 330 for gain, gain-flatness, phase flatness, group delay variation input/output VSWR (Voltage Standing Wave Ratio), which may refer to a measure of how efficiently radio-frequency power s transmitted to/from a power source, through a transmission line or any waveguide interconnection, into a load (for example, from a power amplifier through a transmission line, to an antenna). It should be appreciated that, in some examples, traditional S-Parameters may be measured and/or saved in a traditional format, which may be useful for analysis or loading into commercially available industry standard system simulators and/or extracted for link budget usage.

Figure 3B:
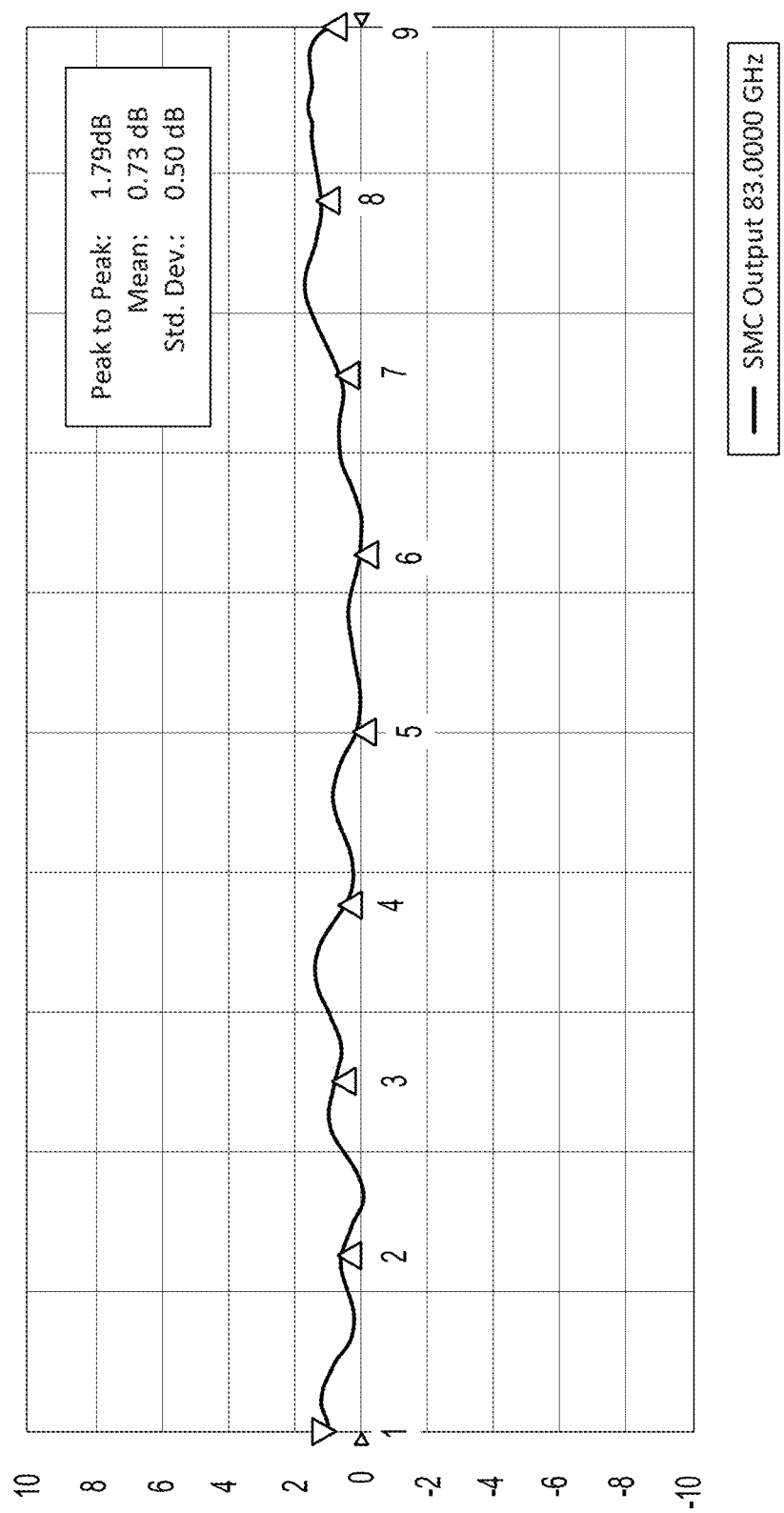
FIG. 3B illustrates a graph depicting calibration and measurement results using the configuration of FIG. 3A, according to an example.

FIG. 3B illustrates a graph 300B depicting calibration and measurement results using the configuration 300A of FIG. 3A, according to an example. Similar to the graph 200B of FIG. 2B, the graph 300B depicts an average of ten (10) measured gain flatness results. However, the graph 300B depicts a 1.79 dB measured flatness to 85 GHz, which is almost 2 dB more measurement accuracy (e.g., improved gain flatness across the 80 GHz band) relative to the configuration 200A of FIG. 2A. This improvement may be particularly stark when attempting to process complex modulated signals through a gateway high-power linear amplifier, for example, and may, among other things, minimize distortion as measured by error vector magnitude (EVM) and improve signal quality and bit error rates (BERs).

Figure 4:
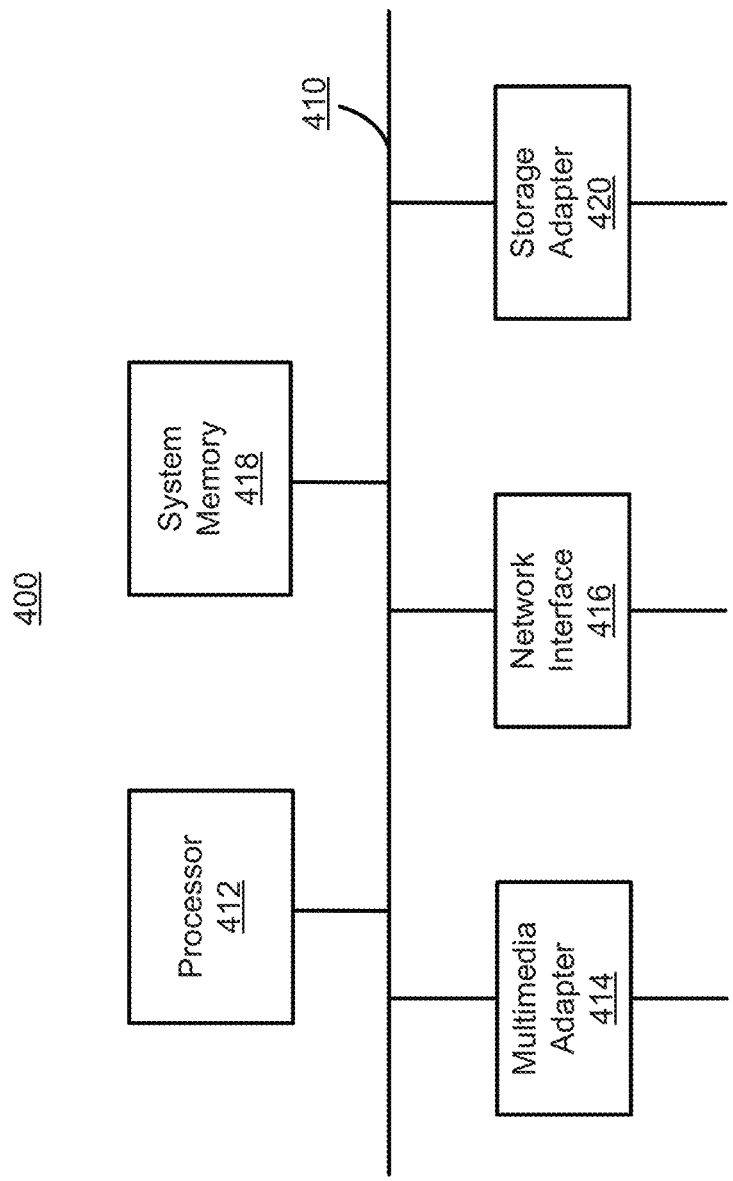
FIG. 4 illustrates a block diagram of a computer system for providing calibration and measurements of a satellite communication (SATCOM) test system, according to an example.

FIG. 4 illustrates a block diagram of a computer system for providing calibration and measurements of a satellite communication (SATCOM) test system, according to an example. The computer system 400 may be part of or any one of the terminals 110, the gateway 130, the network data center 140, the network management system (NMS) 150, the business system 160, as shown in system 100 to perform the functions and features described herein. The computer system 400 may include, among other things, an interconnect 410, a processor 412, a multimedia adapter 414, a network interface 416, a system memory 418, and a storage adapter 420.

The interconnect 410 may interconnect various subsystems, elements, and/or components of the computer system 700. As shown, the interconnect 410 may be an abstraction that may represent any one or more separate physical buses, point-to-point connections, or both, connected by appropriate bridges, adapters, or controllers. In some examples, the interconnect 410 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 410 may allow data communication between the processor 412 and system memory 418, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 412 may be the central processing unit (CPU) of the computing device and may control overall operation of the computing device. In some examples, the processor 412 may accomplish this by executing software or firmware stored in system memory 418 or other data via the storage adapter 420. The processor 412 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 414 may connect to various multimedia elements or peripherals. These may include a device associated with visual (e.g., video card or display), audio (e.g., sound card or speakers), and/or various input/output interfaces (e.g., mouse, keyboard, touchscreen).

The network interface 416 may provide the computing device with an ability to communicate with a variety of remove devices over a network (e.g., private network 170 or public network 180 of FIG. 1) and may include, for example, an Ethernet adapter, a Fibre Channel adapter, and/or other wired- or wireless-enabled adapter. The network interface 416 may provide a direct or indirect connection from one network element to another and facilitate communication and between various network elements.

The storage adapter 420 may connect to a standard computer-readable medium for storage and/or retrieval of information, such as a fixed disk drive (internal or external).

Many other devices, components, elements, or subsystems (not shown) may be connected in a similar manner to the interconnect 410 or via a network (e.g., private network 170 or public network 180 of FIG. 1). Conversely, all the devices shown in FIG. 4 need not be present to practice the present disclosure. The devices and subsystems can be interconnected in different ways from that shown in FIG. 4. Code or computer-readable instructions to implement the dynamic approaches for payment gateway selection and payment transaction processing of the present disclosure may be stored in computer-readable storage media such as one or more of system memory 418 or other storage. Code or computer-readable instructions to implement the dynamic approaches for payment gateway selection and payment transaction processing of the present disclosure may also be received via one or more interfaces and stored in memory. The operating system provided on computer system 700 may be MS-DOS®, MS-WINDOWS®, OS/2®, OS X®, IOS®, ANDROID®, UNIX®, Linux®, or another operating system.

Figure 5:
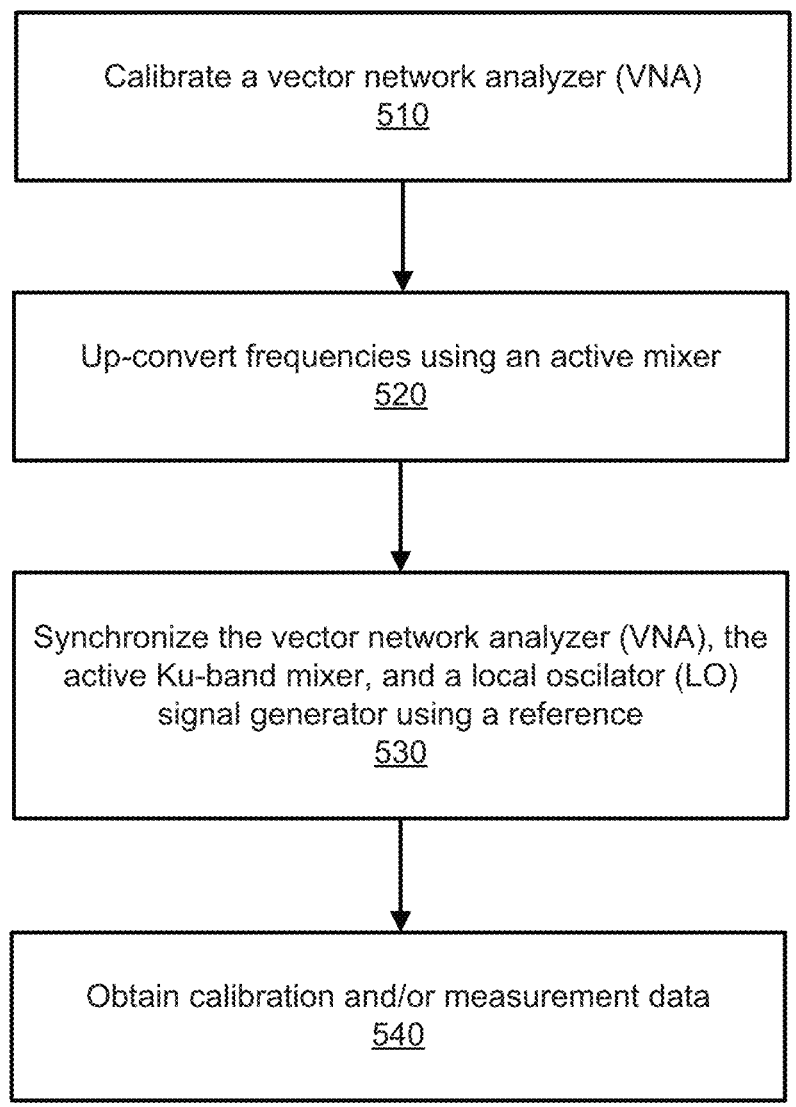
FIG. 5 illustrates a method for providing calibration and measurements of a satellite communication (SATCOM) test system, according to an example.

FIG. 5 illustrates a method 500 for providing calibration and measurements of a satellite communication (SATCOM) test system, according to an example. The method 600 is provided by way of example, as there may be a variety of ways to carry out the method described herein. Although the method 600 is primarily described as being performed by system 100 as shown in FIG. 1 or computer system 500 of FIG. 5, the method 600 may be executed or otherwise performed by other systems, or a combination of systems. Each block shown in FIG. 6 may further represent one or more processes, methods, or subroutines, and one or more of the blocks may include machine-readable instructions stored on a non-transitory computer-readable medium and executed by a processor or other type of processing circuit to perform one or more operations described herein At 510, the vector network analyzer (VNA) 310 may be calibrated. As described above, a 67 GHz VNA, rather than a 27 GHz VNA, may be calibrated. It should be appreciated that a higher frequency vector network analyzer (VNA) 310 may be preferred in some examples because less conversion operations may be required, which in turn may require less uncertainty added by the active mixer. In other words, perhaps only one or two conversion, or none, may be needed when a high frequency vector network analyzer (VNA) system is employed. In some examples, the calibrations may include any number of SOLT-type calibrations described herein. In this way, reference planes where the DUT 330 is measured, for example, may be accounted for.

It should be appreciated that use of electrical standards employed during the calibration may include use of passive short, open, load, and thru (SOLT) standards found in any number of calibration kits, or in some examples, they may include arbitrary known impedances that are electronically switched, as is done with E-Cal electronic calibration modules. With the approach to data-based standards, commercial 1.85 mm (67 GHz) and 1.0 mm (110 GHz) calibration kits may be used, with various data-based models being derived from nominal dimensions.

At 520, the active Ku-band mixer 335 may be up-converted. In some examples, the active Ku-band mixer 335 may be up-converted from the 67 GHz up to the 71-76 or 81-86 GHz. This may be achieved with low-loss and excellent dynamic rage and flatness. It should be appreciated that the active Ku-band mixer 335 characteristics, in some examples, may be saved to a file in the vector network analyzer (VNA) and subtracted (de-embedded) from the measured results automatically. It should be appreciated that use of the active Ku-band mixer 335 and up-converting it may provide several advantages over traditional approaches. For example, the active Ku-band mixer 335 may be much lower-cost and commercially available (approximately ten times lower) than a custom test head, like 220 and 240 of FIG. 2, which are commonly used in less efficient traditional calibration and measurement solutions. Furthermore, use of those custom test heads 220 and 240 may require further customizations from any vector network analyzer (VNA) supplier or manufacturer, which can take time, additional cost, and lead to errors which can additionally require major firmware changes.

At 530, the active Ku-band mixer 335, signal generator 325, and vector network analyzer (VNA) 310 may be synchronized. In some examples, the active Ku-band mixer 335, LO signal generator, and vector network analyzer (VNA) 310 may be synchronized or phase-locked to the reference 315. As described above, this reference 315 may be an external precision 10 MHz or 100 MHz reference easily obtained in standard labs or from a precise GPS reference.

At 540, calibration and/or measurement data may be obtained. For example, S-Parameters may be measured and/or stored in any number of formats. In some examples, the S-Parameters may be stored in a traditional format for analysis and/or loading into system simulators or extracted for link budget usage, or other similar application or use (e.g., in various system modelling software tools).

As mentioned above, what is shown and described with respect to the systems and methods above are illustrative. While examples described herein are directed to configurations as shown, it should be appreciated that any of the components described or mentioned herein may be altered, changed, replaced, or modified, in size, shape, and numbers, or material, depending on application or use case, and adjusted for monitoring system health and/or detecting faults.

It should be appreciated that the systems and methods described herein may a more reliable radiating element. It should also be appreciated that the systems and methods, as described herein, may also include or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the satellite communications system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to satellite communication systems, including high throughput satellite (HTS) systems, it should be appreciated that the systems and methods described herein may also be used in other various systems and other implementations. For example, these may include other various telecommunication test and measurement systems. In fact, there may be numerous applications in cable or optical communication networks, not to mention fiber-optic or sensor systems that could employ the systems and methods as well.

It should be appreciated that the systems and methods described herein may also be used to help provide, directly or indirectly, measurements for distance, angle, rotation, speed, position, wavelength, transmissivity, and/or other related tests and measurements.

By providing improved techniques for calibration and measurements especially in E-band frequencies, the system and methods described herein may provide an efficient, cost-effective, and reliable approach so solve problems that plague conventional calibration and measurement solutions. The examples described herein also provide mechanical and electrical simplicity and adaptability to small or large satellite communication systems. Ultimately, the systems and methods described herein may increase efficiency, reduce cost, minimize existing equipment, minimize adverse effects of traditional systems, and provide enhanced performance.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system for calibration and measurement of a satellite communication (SATCOM) test system using E-band frequencies, comprising:
   a vector network analyzer (VNA) calibrated using a calibration technique, wherein the vector network analyzer (VNA) communicatively coupled to a device under test (DUT);
   a signal generator for generating at least one test signal; and
   an active mixer communicatively coupled to the signal generator, wherein the active mixer up-converts the at least one test signal to E-band frequencies;
   wherein the vector network analyzer (VNA), the signal generator, and the active mixer are synchronized using a reference.

2. The system of claim 1, wherein the vector analyzer (VNA) operates at 67 GHz.

3. The system of claim 1, wherein the calibration technique comprises a SOLT-type calibration technique that uses short, open, load, and through (SOLT) calibration standards.

4. The system of claim 1, wherein the device under test (DUT) comprises one or more network devices or systems used for broadband provisioning.

5. The system of claim 1, wherein the signal generator is a local oscillator (LO) signal generator that generates at least one local oscillator (LO) signal.

6. The system of claim 1, wherein the active mixer is an active Ku-band mixer.

7. The system of claim 1, wherein the active mixer up-coverts the at least one signal to E-band frequencies, up to 71-76 or 81-86 GHz, with low-loss, low-noise and high-dynamic range, and amplitude and phase flatness.

8. The system of claim 1, wherein active Ku-band mixer characteristics or settings used in up-conversion are automatically saved to a file in the vector network analyzer (VNA) and de-embedded from measured results.

9. The system of claim 1, wherein the synchronization comprises phase-locking the vector network analyzer (VNA), the local oscillator (LO) signal generator, and the active mixer.

10. The system of claim 1, wherein the reference used in synchronizing the vector network analyzer (VNA), the local oscillator (LO) signal generator, and the active mixer is an external precision 10 MHz or 100 MHz reference.

11. A method of providing calibration and measurements, comprising:
   calibrating a vector network analyzer (VNA);
   up-converting frequencies using an active mixer;
   synchronizing the vector network analyzer (VNA), the active mixer, and a signal generator communicatively coupled to the active mixer using a reference; and
   obtaining calibration and measurement data at a device under test.

12. The method of claim 11, wherein the vector analyzer (VNA) operates at 67 GHz.

13. The method of claim 11, wherein the vector analyzer (VNA) is calibrated using a SOLT-type calibration technique that uses short, open, load, and through (SOLT) calibration standards.

14. The method of claim 11, wherein the device under test (DUT) comprises one or more network devices or systems used for broadband provisioning.

15. The method of claim 11, wherein the signal generator is a local oscillator (LO) signal generator that generates at least one local oscillator (LO) signal.

16. The method of claim 11, wherein the active mixer is an active Ku-band mixer.

17. The method of claim 11, wherein the active mixer up-coverts at least one signal to E-band frequencies, up to 71-76 or 81-86 GHz, with low-loss, low-noise and high-dynamic range, and amplitude and phase flatness.

18. The method of claim 11, further comprising:
saving active Ku-band mixer characteristics or settings used in up-conversion to a file in the vector network analyzer (VNA); and
de-embedding the active Ku-band mixer characteristics or settings from measured results.

19. The method of claim 11, wherein the synchronization comprises phase-locking the vector network analyzer (VNA), the local oscillator (LO) signal generator, and the active mixer, and wherein the reference used is an external precision 10 MHz or 100 MHz reference.

20. A non-transitory computer-readable storage medium having an executable stored thereon, which when executed instructs a processor to perform the following:
calibrating a vector network analyzer (VNA);
up-converting frequencies using an active mixer;
synchronizing the vector network analyzer (VNA), the active mixer, and a signal generator communicatively coupled to the active mixer using a reference; and
obtaining calibration and measurement data at a device under test.

* * * * *